United States Patent
Yamamoto et al.

(10) Patent No.: US 9,015,272 B2
(45) Date of Patent: Apr. 21, 2015

(54) MICROCOMPUTER

(75) Inventors: Hirofumi Yamamoto, Obu (JP); Yuki Horii, Kariya (JP); Takashi Abe, Kariya (JP); Shinichirou Taguchi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 200 days.

(21) Appl. No.: 13/403,076

(22) Filed: Feb. 23, 2012

(65) Prior Publication Data

US 2012/0221679 A1    Aug. 30, 2012

(30) Foreign Application Priority Data

Feb. 28, 2011 (JP) .................................. 2011-42175

(51) Int. Cl.
| | |
|---|---|
| G06F 15/16 | (2006.01) |
| G06F 13/20 | (2006.01) |
| G06F 13/26 | (2006.01) |
| G06F 13/32 | (2006.01) |

(52) U.S. Cl.
CPC ................ *G06F 13/20* (2013.01); *G06F 13/26* (2013.01); *G06F 13/32* (2013.01)

(58) Field of Classification Search
CPC ... G06F 9/3016; G06F 9/30167; G06F 9/327; G06F 9/342; G06F 9/345; G06F 9/355; G06F 9/3822; G06F 9/3842; G06F 9/3861; G06F 9/3879; G06F 9/3885; G06F 15/16; G06F 13/20; G06F 13/32; G06F 13/26
USPC .................................... 709/217; 711/123, 126
See application file for complete search history.

(56) References Cited

U.S. PATENT DOCUMENTS

| | | | | |
|---|---|---|---|---|
| 4,882,702 | A | * | 11/1989 | Struger et al. ..................... 710/2 |
| 6,167,489 | A | * | 12/2000 | Bauman et al. ............... 711/145 |
| 6,658,493 | B1 | | 12/2003 | Fujioka |
| 2003/0056081 | A1 | * | 3/2003 | Leach et al. .................. 711/220 |
| 2003/0221062 | A1 | | 11/2003 | Shimada |
| 2008/0215829 | A1 | * | 9/2008 | Lin et al. ....................... 711/155 |

(Continued)

FOREIGN PATENT DOCUMENTS

| | | |
|---|---|---|
| JP | A-H7-36372 | 2/1995 |
| JP | A-H9-200215 | 7/1997 |

(Continued)

OTHER PUBLICATIONS

Office Action dated Feb. 5, 2013 mailed in corresponding JP Application No. 2011-042175 (with English translation).

*Primary Examiner* — Jeffrey Nickerson
*Assistant Examiner* — Mehulkumar Shah
(74) *Attorney, Agent, or Firm* — Posz Law Group, PLC

(57) ABSTRACT

Between a CPU and a communication module, a write buffer, a write control section, a read buffer and a read control section are provided. The CPU directly accesses and the write buffer and the read buffer. By periodically outputting a communication request, the read control section reads data, which the communication module received from other nodes, and transfers the data to the read buffer. The write control section transfers to the communication module the data written in the write buffer as transmission data. In addition, a bypass access control section and an access sequence control section are provided. The bypass access control section controls direct data read and data write between the CPU and the communication module. The access sequence control section controls sequence of accesses of the control sections to the communication module.

8 Claims, 12 Drawing Sheets

(56) References Cited

U.S. PATENT DOCUMENTS

2008/0238347 A1    10/2008    Akiyama et al.
2009/0268744 A1*    10/2009    Ihle et al. ...................... 370/401
2010/0312935 A1*    12/2010    Higuchi ........................ 710/112

FOREIGN PATENT DOCUMENTS

JP    A-2000-14144    1/2000
JP    A-2009-289232    12/2009

* cited by examiner

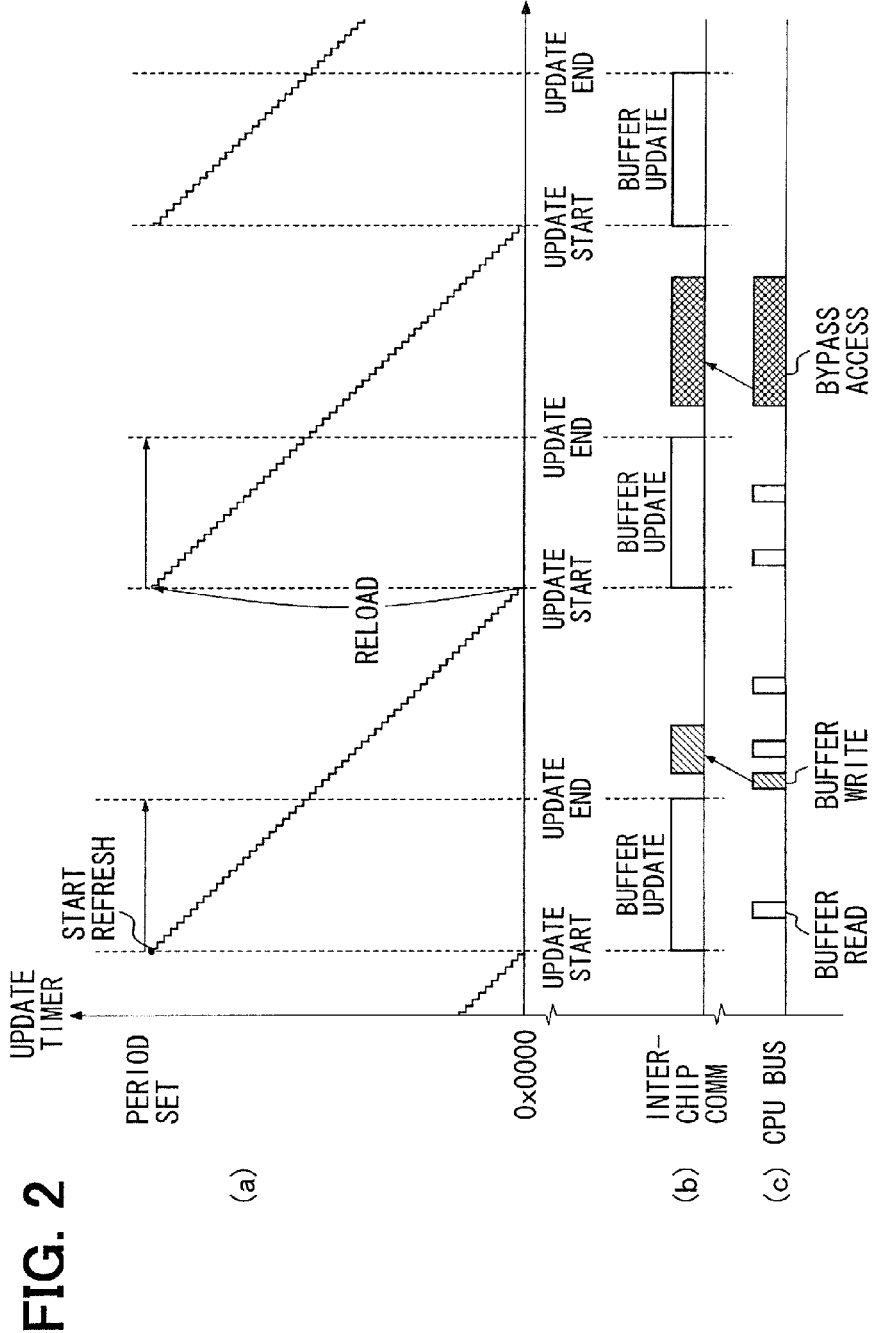

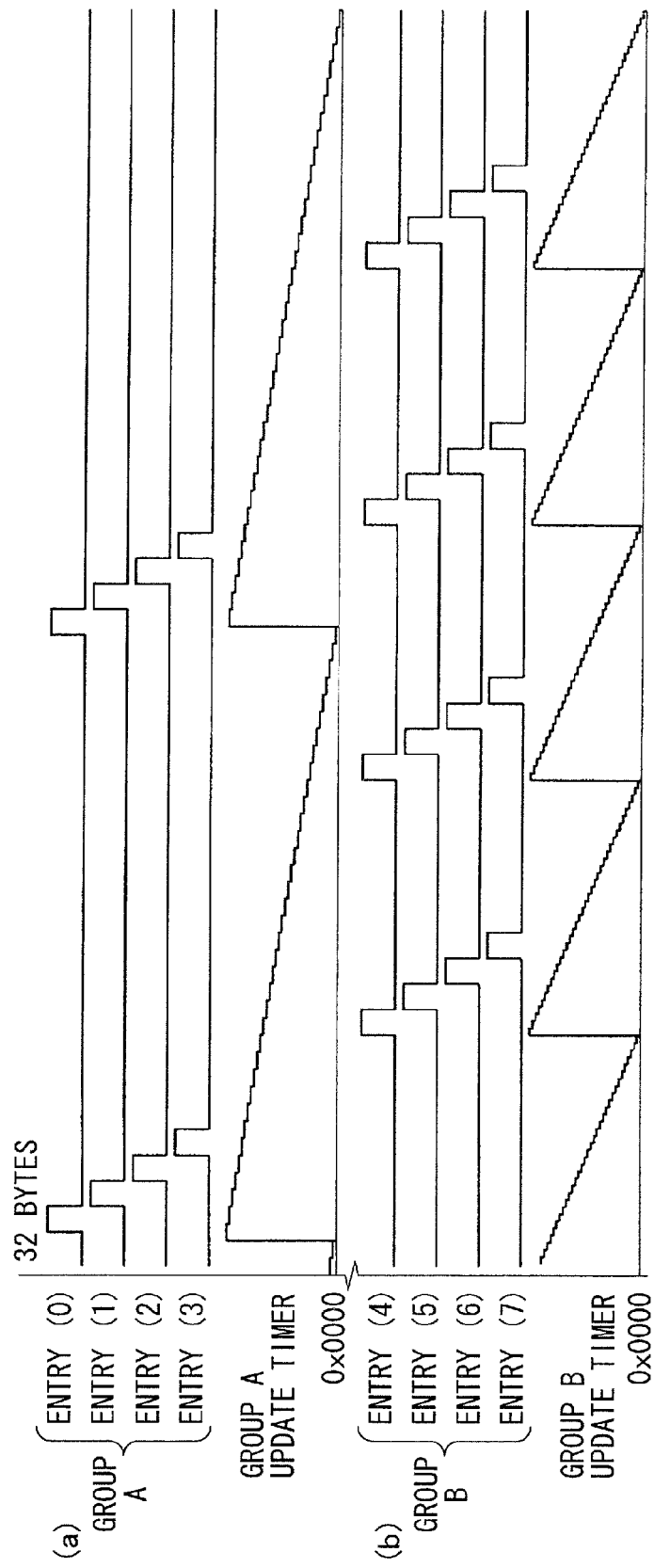

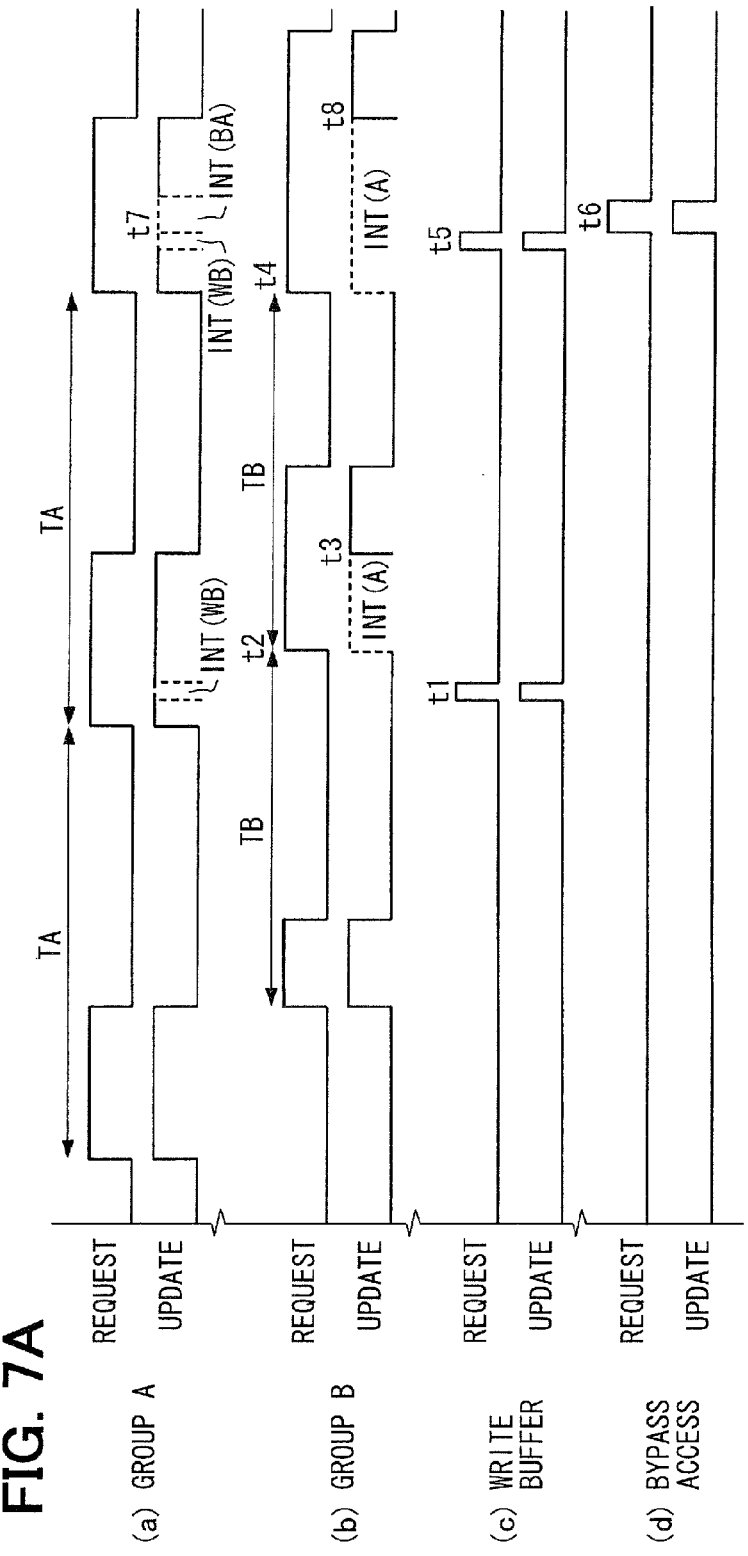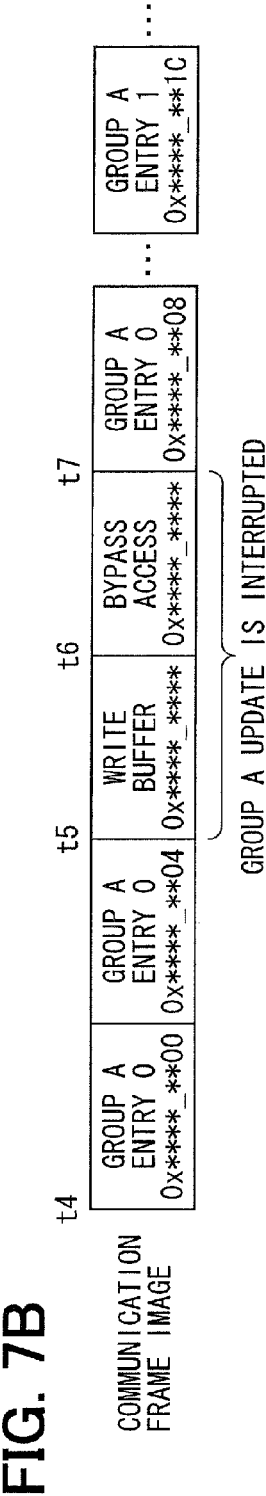

MICROCOMPUTER

CROSS REFERENCE TO RELATED APPLICATION

This application is based on and incorporates herein by reference Japanese patent application No. 2011-42175 filed on Feb. 28, 2011.

TECHNICAL FIELD

The present disclosure relates to a microcomputer, which has a communication module and communicates with other communication nodes connected to a communication network.

BACKGROUND

Recently operation processing of a central processing unit (CPU) is speeded up and hence its operation speed is much faster than those of peripheral circuits. When the CPU reads out data stored in a register of low speed, latency increases and processing efficiency is lowered. To prevent the processing efficiency from being lowered, JP 2009-289232A (FIG. 1) for example discloses a configuration, in which data stored in peripheral modules (low speed registers) are copied into a register entry (high speed register), and CPUs acquire the data by accessing only the register entry.

To maintain coherency between the peripheral modules and the register entry, data of same value are written in both modules and the register entry. In the midst of write cycle of a peripheral bus of low speed, a write completion notification is transmitted to the register entry and a flag indicating agreement of data (parity bit) is set. The CPUs check, by checking a logic level of the parity bit, whether the data are the same between the peripheral modules and the register entry.

In a microcomputer connected to a communication network, a CPU performs access to a peripheral circuit within a chip at high speeds but performs communications through a communication interface and a network at low speeds. In case that the above-described technology is directly applied to such a microcomputer, it is necessary to provide a high speed register between the CPU and a communication interface (buffer) and connect the communication interface and the high speed register by an exclusive bus, which is capable of high speed data transfer. However it is not readily possible because of difficulty in adapting the communication interface to be operable at high access speed and of high cost.

SUMMARY

It is therefore an object of the present disclosure to provide a microcomputer, which is connected to a communication network and can prevent lowering of processing efficiency of a host by a simple and low cost configuration.

A microcomputer includes a communication module, a host, a read buffer, a write buffer, a read control section, a write control section, a bypass access control section and an access sequence control section. The communication module performs communication with an other node connected to a communication network. The host includes at least a CPU. The read buffer is provided between the communication module and the host so that the host reads out data. The write buffer is written with data by the host. The read control section periodically outputs a communication request to the communication module so that the communication module transfers data received from the external node to the read buffer. The communication request is for a data read destination. The write control section transfers the data written in the write buffer to the communication module as a transmission data. The bypass access control section controls the host to perform reading and writing of data directly with the communication module without through the read buffer and the write buffer. The access sequence control section controls sequence of accesses of the read control section, the write control section and the bypass access control section to the communication module.

BRIEF DESCRIPTION OF THE DRAWINGS

In the drawings:

FIG. 2 is a timing chart showing an operation of the first embodiment;

FIG. 3 is a schematic illustration of an image of a communication frame used in the first embodiment;

FIG. 6 is a timing chart showing updating entry in a read buffer in accordance with two updating periods in the second embodiment;

FIG. 7A is a timing chart showing cases, in which updating periods are partly overlapping and accesses are partly conflicting between groups A and B in the second embodiment;

FIG. 7B is an illustration of an image of a communication frame used in the second embodiment;

DETAILED DESCRIPTION (First Embodiment)

Figure 1:
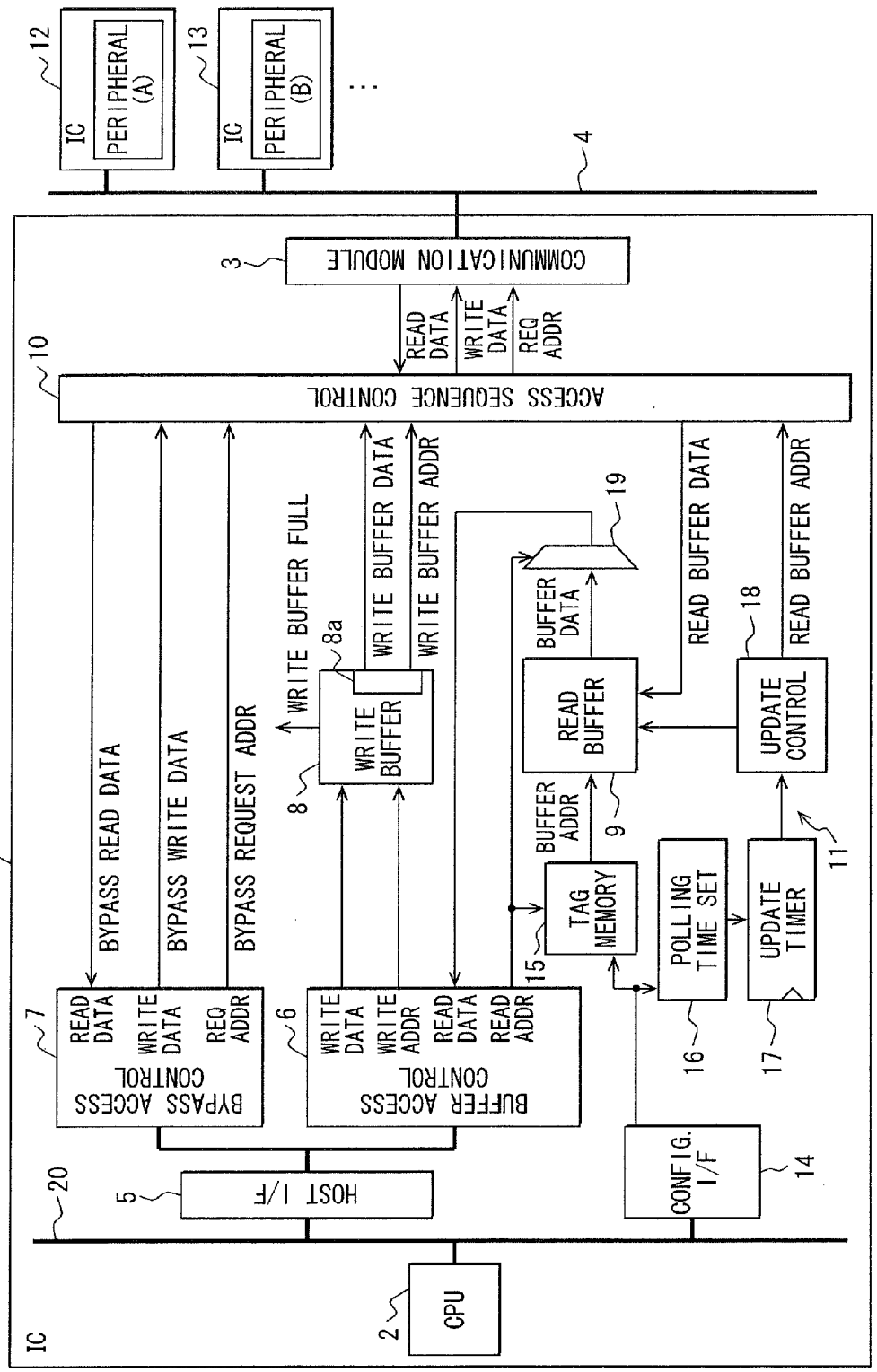
FIG. 1 is a functional block diagram showing a microcomputer according to a first embodiment.

Referring to FIG. 1 showing a first embodiment, a microcomputer 1 is an integrated circuit IC. The microcomputer 1 includes a CPU (host) 2 and is connected to a communication bus 4 (communication network) through a communication module 3. A buffer access control section 6, a bypass access control section 7, a write buffer 8, a read buffer 9, an access sequence control section 10 and the like are provided between the CPU 2 and the communication module 3.

The CPU 2 writes transmission data by accessing the write buffer 8 through the buffer access control section 6 in transmitting the data by the communication module 3. The bus size of the CPU 2 is for example about 32 bits and an operating clock frequency of the CPU 2 is about 10 MHz to 100 MHz. Therefore the data transfer speed between the CPU 2 and the write buffer 8 is up to several Gbps. The buffer access control section 6 outputs a write address Write Addr and a write data Write Data to the write buffer 8. The volume of the write buffer 8 is for example from 4 to 8 words assuming that one word is 32 bits. The write buffer 8 renders a signal Write Buffer Full active when data are written in all areas by the CPU 2. The state of this signal is monitored by the CPU 2 and the access sequence control section 10.

When writing is completed from the CPU 2 side, a write control section 8a built in the write buffer 8 outputs a write address Write Buffer Addr, which designates a transmission buffer in the communication module 3, and a write data Write Buffer Data to the access sequence control section 10. The access sequence control section 10 outputs and transfers the address and the data output by the write buffer 8 to the communication module 3 as an address Req Addr and a write data Write Data. The communication module 3 outputs and transfers the data transferred from the write buffer 8 to a peripheral circuit (A) 12, a peripheral circuit (B) 13 and the like, which are provided as other communication nodes connected to the communication bus 4. The peripheral circuits 12, 13 are also integrated circuits IC, respectively. The destination of transmission is determined by the address output by the CPU 2. The transfer speed (inter-chip communication speed) on the communication bus 4 is for example about up to several Mbps.

The read buffer 9 is controlled by the read control section 11. The read control section 11 generates data transmission requests to the peripheral circuits 12, 13 and the like, which are the external nodes connected to the communication bus 4, by periodically accessing the communication module 3 through the access sequence control section 10. The communication module 3 causes the read buffer 9 to transfer the data received from the peripheral circuits 12, 13 and the like. The CPU 2 reads out the data, which the communication module 3 received, by accessing the read buffer 9 through the buffer access control section 6. The peripheral circuits 12 and 13 are peripheral to the microcomputer 1 when viewed from the microcomputer 1. However, these peripheral circuits 12, 13 may also be microcomputers similar to the microcomputer 1.

The read control section 11 includes a configuration interface (I/F) 14, a tag memory 15, a polling time setting section 16, an update timer 17, an update control logic 18 and the like. The I/F 14 is an interface, by which the CPU 2 performs setting in the read control section 11 at the time of initial setting performed when electric power is supplied to the microcomputer 1. The CPU 2 performs setting in the tag memory 15 and the section 16 through the I/F 14.

Entries, each of which is a block area of a unit of 32 bytes, are defined in the data storage area of the read buffer 9. In the tag memory 15, Buffer Addr indicating a base address of each entry is written by a number of entries. The capacity of the read buffer 9 is for example about 1 k bytes. A period data, which causes the read buffer 9 to transfer data, is set in the polling time setting section 16. This period data is loaded in the update timer 17. The update control logic 18 outputs a read address Read Buffer Addr to the access sequence control section 10 in accordance with a fixed interval measured by the update timer 17. This read address Read Buffer Addr is an address for designating a destination (communication request designating a communication destination), from which data is read out. Its output pattern, that is, an object from which data is acquired through the communication bus 4 is predetermined.

The access sequence control section 10 transfers the address, which the update control logic 18 outputted, as the address Req Addr to the communication module 3. The communication module 3 generates data transmission requests to any one of nodes such as the peripheral circuits 12, 13 and the like, which are connected to the communication bus 4 in accordance with the given address. The communication module 3 sends the data, which are returned in response to the request, as a Read Data to the access sequence control section 10. The access sequence control section 10 transfers the received data as a Read Buffer Data to the read buffer 9. In case of this transferring, the update control logic 18 outputs the write destination address of the received data Read Buffer Data to the read buffer 9. This write destination address is 4 bytes.

When the CPU 2 reads out the data written in the read buffer 9, it applies the read address Read Addr to the multiplexer 19, which is at the data output side of the tag memory 15 and the read buffer 9, through the buffer access control section 6. The 9th and higher bits of the read address Read Addr from the LSB side are applied to the tag memory 15. The tag memory 15 outputs the base address, which corresponds to the address, to the read buffer 9. The read buffer 9 outputs the data of 32 bytes, which correspond to the base address, to the multiplexer 19. The 8th to 6th bits of the read address Read Addr are applied to the multiplexer 19. The multiplexer 19 selects 4 bytes of the 32 byte data applied to the input side in accordance with the address of 3 bits and outputs it to the buffer access control section 6 as the read data Read Data.

Separately from the access path described above, the CPU 2 is configured to be able to directly access the communication module 3 (bypass path) through the bypass access control section 7 and the access sequence control section 10. In this case, the CPU 2 writes the transmission data in the communication module 3 and directly reads the reception data from the communication module 3. The bypass access control section 7 outputs an address Bypass Request Address and a write data Bypass Write Data to the access sequence control section 10. In case of reading out data, the data Bypass Read Data is acquired. The host interface 5 switches over the access path to either one of the buffer access control section 6 or the bypass access control section 7 in accordance with whether the address outputted by the CPU 2 indicates an access to the write buffer 8 or the read buffer 9 or it indicates a direct access (bypass access) to the communication module 3.

According to the above-described configuration, the CPU 2 can read and write data by accessing the write buffer 8 and the read buffer 9 at high speeds. Transmission of the data written in the write buffer 8 and communication on the bus 4 are performed by a hardware without the CPU 2. Storing of the data into the read buffer 9 is performed by the read control section 11 and the like, which are hardwares and automatically perform communication on the communication bus 4.

The data, which the CPU 2 reads out through the read buffer 9, is likely to be a data of one cycle period ago of update cycle period of the update timer 17. The data, which the CPU 2 transmits through the write buffer 8, is delayed by a period of time of passing the write buffer 8. When the CPU 2 needs to acquire a value of a specific data in synchronism with its processing of a control program or needs to transmit it, the CPU 2 directly access the communication module 3 through the bypass access control section 7 while bypassing the write buffer 8 and the read buffer 9. Thus it is also possible to directly perform transmission and reception of communication data. Although not shown, a memory, which stores the control program executed by the CPU 2, and a memory, which is used as a work area and the like in executing the control program, are directly connected to the CPU bus 20.

The operation of the first embodiment is described next with reference to FIG. 2 to FIGS. 4A, 4B. As shown in FIG.

4A showing the access processing, which the CPU 2 performs in reading and writing of data, the CPU 2 checks whether it accesses the write buffer 8 or 9 side or it selects the bypass path (step S1). In case of accessing the write buffer 8 or 9 side and writing (step S2: WR), the CPU 2 refers to the signal Write Buffer Full and checks whether the write buffer 8 is full (step S3). If it is not full (NO), the CPU 2 writes data in the write buffer 8 (step S4). Thus accessing is completed. In case of reading (RD) at step S2, the CPU 2 reads data from the read buffer 9 (step S5).

If the CPU 2 selects the bypass path side at step S1, the CPU 2 refers to the signal Write Buffer Full and checks whether the write buffer 8 is empty (the above-described signal is inactive) (step S6). If the write buffer 8 is not empty, it is likely that the access sequence control section 10 is being accessed for transmission of data. The CPU 2 therefore waits until the write buffer 8 becomes empty. When the write buffer 8 becomes empty (YES), the CPU 2 outputs the address Bypass Request Address to the access sequence control section 10 through the bypass access control section 7 (step S7: generation of bus request). When the transferring corresponding to reading/writing of data is completed (step S8: bus request completion), accessing is completed. In the above-described processing, the selection of path at step S1 is performed through the host interface 5.

Figure 4A:
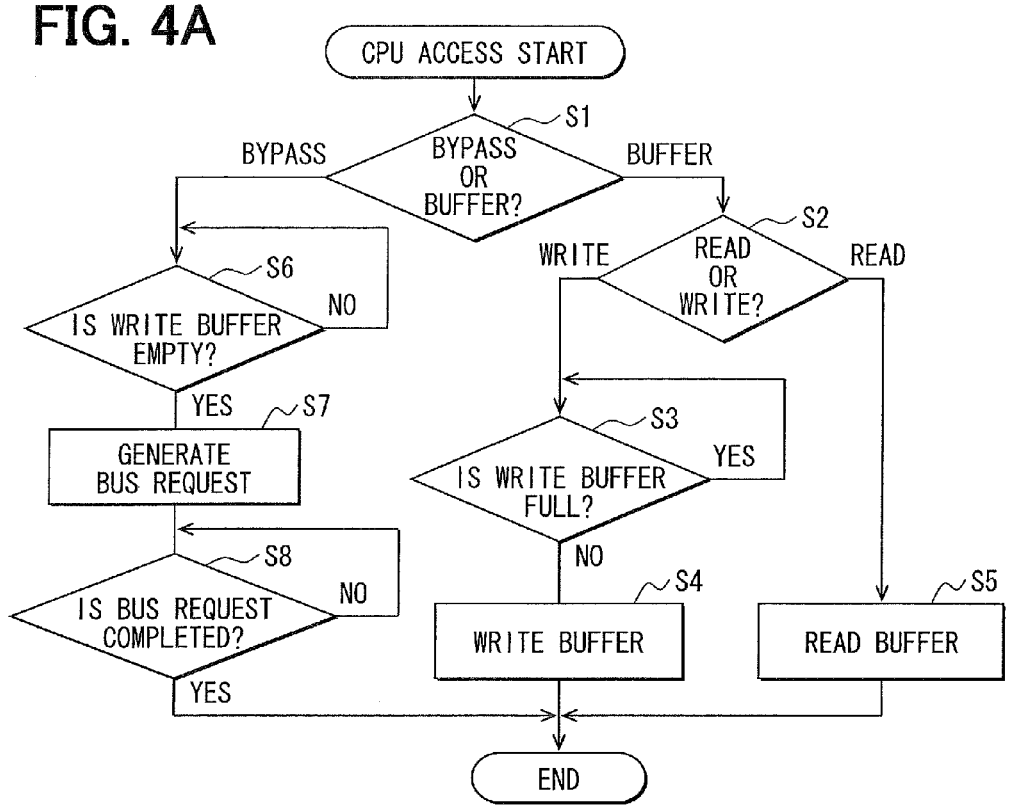
FIG. 4A is a flowchart showing access processing of a CPU performed in the first embodiment.
Figure 4B:
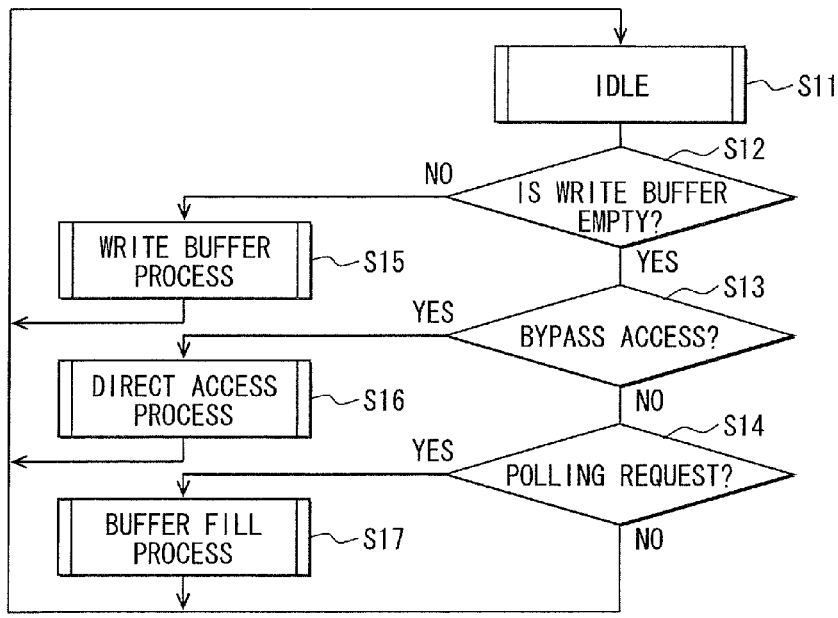
FIG. 4B is a flowchart showing communication control processing of an access sequence control section in the first embodiment.
Figure 5:
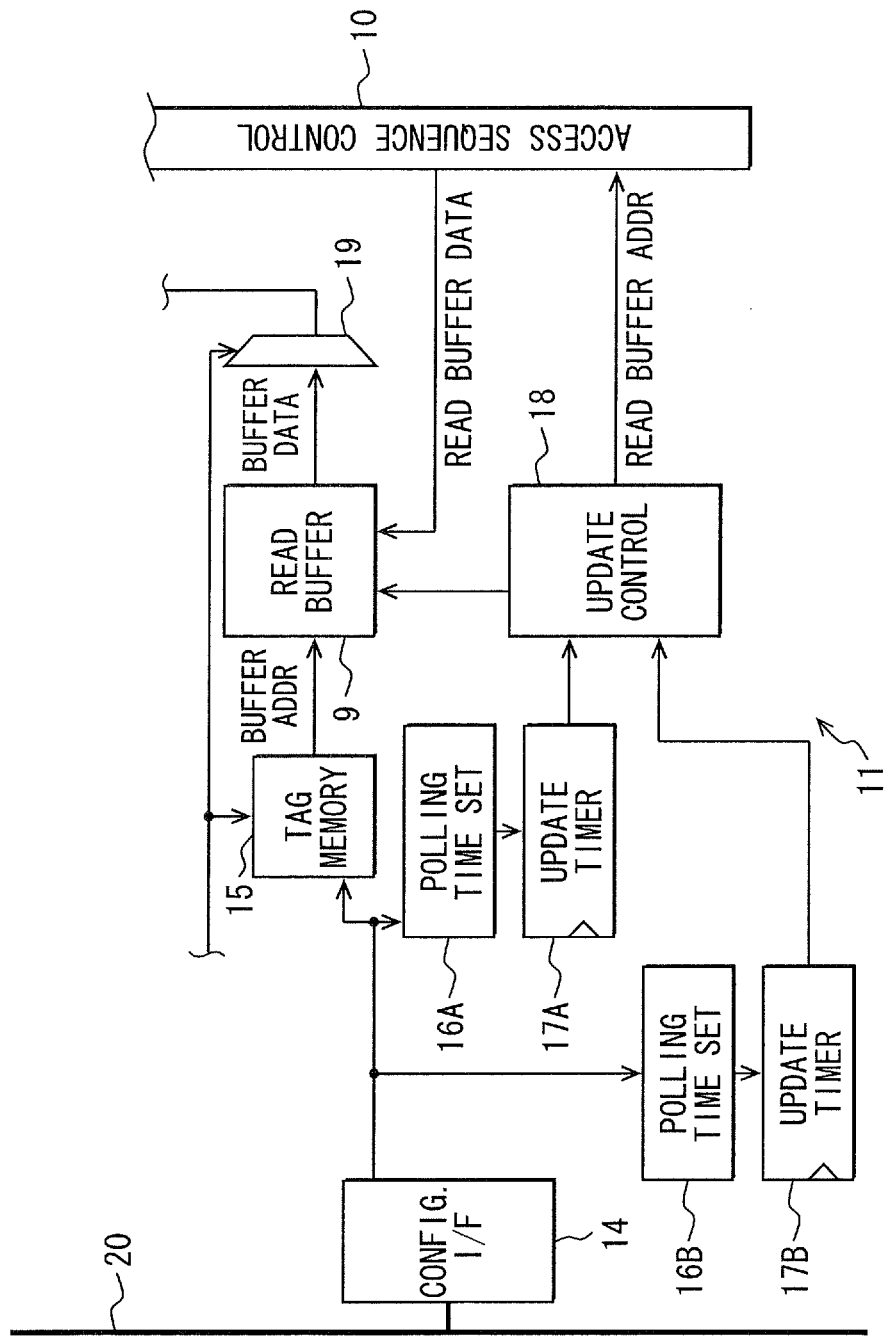
FIG. 5 is a functional block diagram showing partly a microcomputer according to a second embodiment.

As shown in FIG. 4B showing the processing related to communication control performed mainly by the access sequence control section 10, after executing an idle state processing (step S11), the CPU 2 checks whether the write buffer 8 is empty (step S12) in the similar manner as step S6. If it is not empty (NO), the CPU 2 causes the write buffer 8 to perform transfer of data to the access sequence control section 10 (step S15: write buffer process). When the data transfer processing is completed, step S11 is executed.

If the write buffer 8 is empty (YES) at step S12, the CPU 2 checks whether the access request from the CPU 2 to the bypass path is present (step S13). If the access request is present (YES), the CPU 2 accepts the access request through the bypass access control section 7 and processes it (step S16: direct access process). Then step S11 is executed. If the access request is not present (NO), the CPU 2 checks whether the address Read Buffer Addr is generated from the update control logic 18, that is, whether a polling request is present (step S14). If the polling request is present (YES), the CPU 2 performs the buffer fill process in response to the polling request thereby to transfer the data received from the other node through the communication module 3 to the read buffer 9.

In FIG. 2, (a) shows a down-counting operation, which the update timer 17 performs. By this count operation, the period (polling period), at which the update control logic 18 starts to output the address Read Buffer Addr to the access sequence control section 10, is set. A timer value set in the polling time setting section 16 is loaded to the timer 17 and a trigger is applied to the update control logic 18 at a timing of starting the down-count operation. The update control logic 18 responsively starts polling (update: refresh). After the polling is completed, the timer value of the timer 17 becomes zero and at the same time the timer value is reloaded to repeat the same operation.

In FIG. 2, (b) shows an inter-chip communication state. During a fixed time from the beginning of the polling period, the data, which the communication module 3 received, is transferred to the read buffer 9 in response to the communication request of the update control logic 18 (step S17: buffer fill process). Here, FIG. 3 shows an image of a communication frame, that is, a data format transferred on the bus of the microcomputer 1. In the read buffer 9, the data stored in one entry is 32 bytes. Therefore, 4-byte accessing is repeated 8 times. The polling is performed consecutively in accordance with the number of entries set in the read buffer 9.

In FIG. 2, (c) shows various accesses, which the CPU 2 performs. The CPU 2 can perform read accesses to the read buffer 9 even in the period of data transfer (buffer updating). Since the data transfer to the read buffer 9 is performed at low speeds, the read access is performed by interrupting the transfer operation by a read cycle of the CPU 2. When the CPU 2 writes data in the write buffer 8, the data is transmitted immediately by performing the inter-chip communication. When the CPU 2 performs accessing (read) to the bypass path in a period other than the data transfer period of the read buffer 9, this period is for real-time inter-chip communications.

According to the first embodiment described above, the read buffer 9, the write buffer 8, the read control section 11 and the write control section 8a are provided between the CPU 2 and the communication module 3. The CPU 2 directly accesses the read buffer 9 and the write buffer 8. By periodically outputting the communication request, the read control section 11 reads data, which the communication module 3 received from other nodes, and transfers the data to the read buffer 9. The write control section 8a transfers to the communication module 3 the data written in the write buffer 8 as the transmission data. In addition, the bypass access control section 7 and the access sequence control section 10 are provided. The bypass access control section 7 controls direct data read and data write between the CPU 2 and the communication module 3. The access sequence control section 10 controls the sequence of accesses of the control sections 6, 7, 8a to the communication module 3.

Thus, the CPU 2 is only required to perform reading and writing data by accessing the read buffer 9 and the write buffer 8 at high speeds. Since the read control section 11 and the write control section 8a performs the data transfer relative to the communication module 3 at low speeds through the access sequence control section 10, the latency of access of the CPU 2 can be shortened and the processing efficiency can be improved. In case that the data need be transmitted and received in synchronization with the processing of the control program, the data can be transmitted and received directly through the bypass access control section 7 without through the write buffer 8 and the read buffer 9.

When the CPU 2 outputs the write request to the write buffer 8 while the read control section 11 is transferring the data to the read buffer 9, the access sequence control section 10 interrupts the data transfer and allows the CPU 2 to write data in the write buffer 8 with priority. Thus, while the data is being transferred to the read buffer 9, the CPU 2 is enabled to persistently perform accessing to the write buffer 8 without being interrupted. When the CPU 2 outputs the bypass access request while the read control section 11 is transferring the data to the read buffer 9, the access sequence control section 10 interrupts the data transfer and allows the CPU 2 to access the communication module 3 with priority. Thus, while the data is being transferred to the read buffer 9, the CPU 2 is enabled to persistently perform accessing to the communication module 3 without being interrupted.

(Second Embodiment)

In a second embodiment shown in FIG. 5 to FIG. 8, the read control section 11 is configured differently from the first embodiment. In the read control section 11, each of the polling time setting section 16 and the update timer 17 is provided in two sets as designated by 16A, 16B and 17A, 17B. Different timer values are set in the update timers 17A, 17B by the polling time setting sections 16A, 16B, respectively. The update control logic 18 receives trigger signals from the update timers 17A, 17B and changes output addresses Read Buffer Addr based on which update timer 17A, 17B outputted the trigger signal.

FIG. 6 shows states of updating entries in the read buffer 9 in correspondence to two update periods TA, TB generated by the update timers 17A, 17B. In FIG. 6, (a) and (b) correspond to an A-side (group A) and a B-side (group B), respectively. Updating of each entry corresponds to data of 32 bytes (8×4 bytes). In an initial interval in each period, the entries (0) to (3) and the entries (4) to (7) are updated.

FIG. 7A shows cases, in which update periods TA, TB partly overlap and accesses partly overlap between the groups A, B. At time t1 in the figure, the CPU 2 is assumed to write data in the write buffer 8 while the read buffer 9 (entries (0) to (3)) is being updated by the group A. At this moment, updating of the read buffer 9 is temporarily interrupted as indicated by INT(WB) and writing in the write buffer 8 is performed with priority.

When the update request is generated at time t2 by the group B while the read buffer 9 is being updated by the group A, this update request is made pending, that is, updating is interrupted by the group A as indicated by INT(A). When the updating by the group A is completed at time t3, the entries (4) to (7) are updated by the group B. At time t4, the update requests for the read buffer 9 are generated by the group A, B at the same time. In this case, updating of the group A side is given priority and the request of the group B is made pending.

When the write request for the write buffer 8 and the bypass access request are generated at times t5 and t6, respectively, while the group A side is being updated, these requests are given priorities and the updating of the group A side is made pending, that is, the updating is interrupted as indicated by INT(WB) and INT (BA). When the bypass access is completed at time t7, updating by the group A is continued. When this updating is completed, updating of the group B side is performed at time t8. FIG. 7B shows an image of the communication frame at times t4 to t7. While the read buffer 9 is being updated by the group A, the write buffer data and the bypass access data are interrupting.

Figure 8:
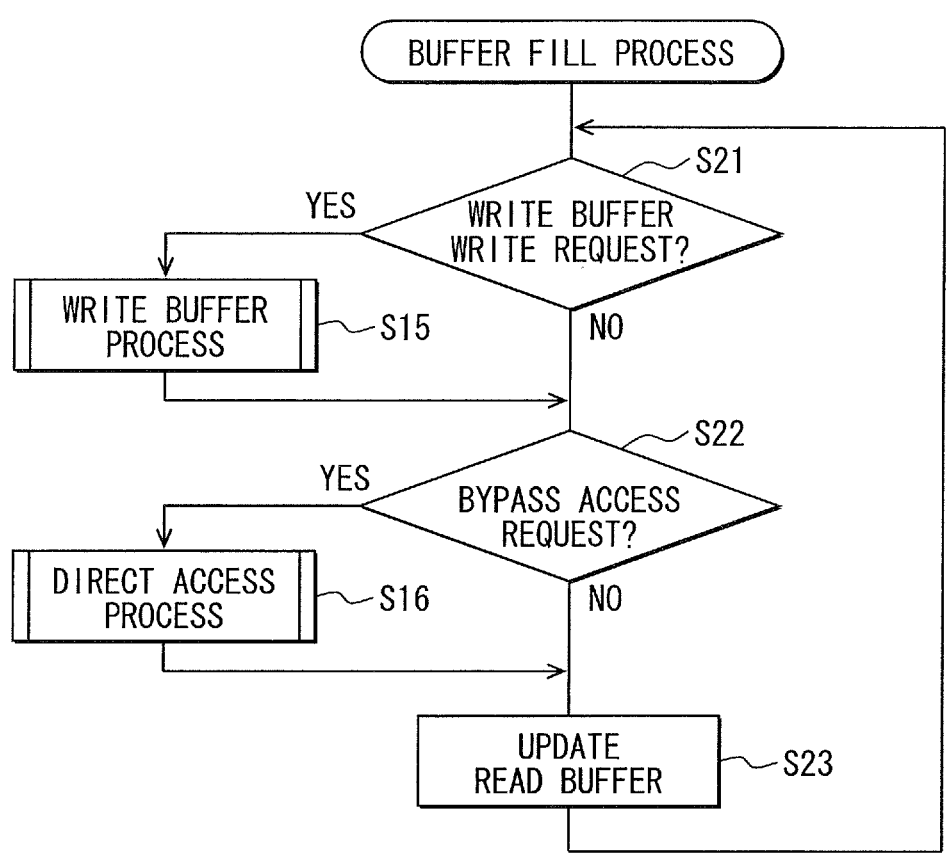
FIG. 8 is a flowchart showing details of a buffer filling process executed in the second embodiment and corresponding to the timing chart of FIG. 7A.

In case of the timing chart of FIG. 7, the buffer fill process is performed as shown in FIG. 8. Even while the read buffer 9 is being updated, the access sequence control section 10 checks whether the write request (step S21) or the bypass access request (step S22) for the write buffer 8 is generated. When either one of the requests is generated (YES), such a request is performed with priority (S15, S16). While none of the requests is being generated (step S22: NO), the read buffer 9 is updated (step S23).

According to the second embodiment, in case that the read control section 11 is configured to generate the communication requests at a plurality of independent periods TA, TB, the access sequence control section 10 accepts other communication requests after completion of data transfer, which is being performed, when the communication request corresponding to the other periods is generated in a period, in which data transfer for the read buffer 9 is being performed by the read control section 11 in accordance with the communication request based on any one of completions. As a result, even when the data transfer to the read buffer 9 is performed based on a plurality of periods, the access sequence control section 10 regulates the sequence of accesses to perform the data transfer surely. It is of course possible to perform it by generating three or more periods.

(Third Embodiment)

Figure 9:
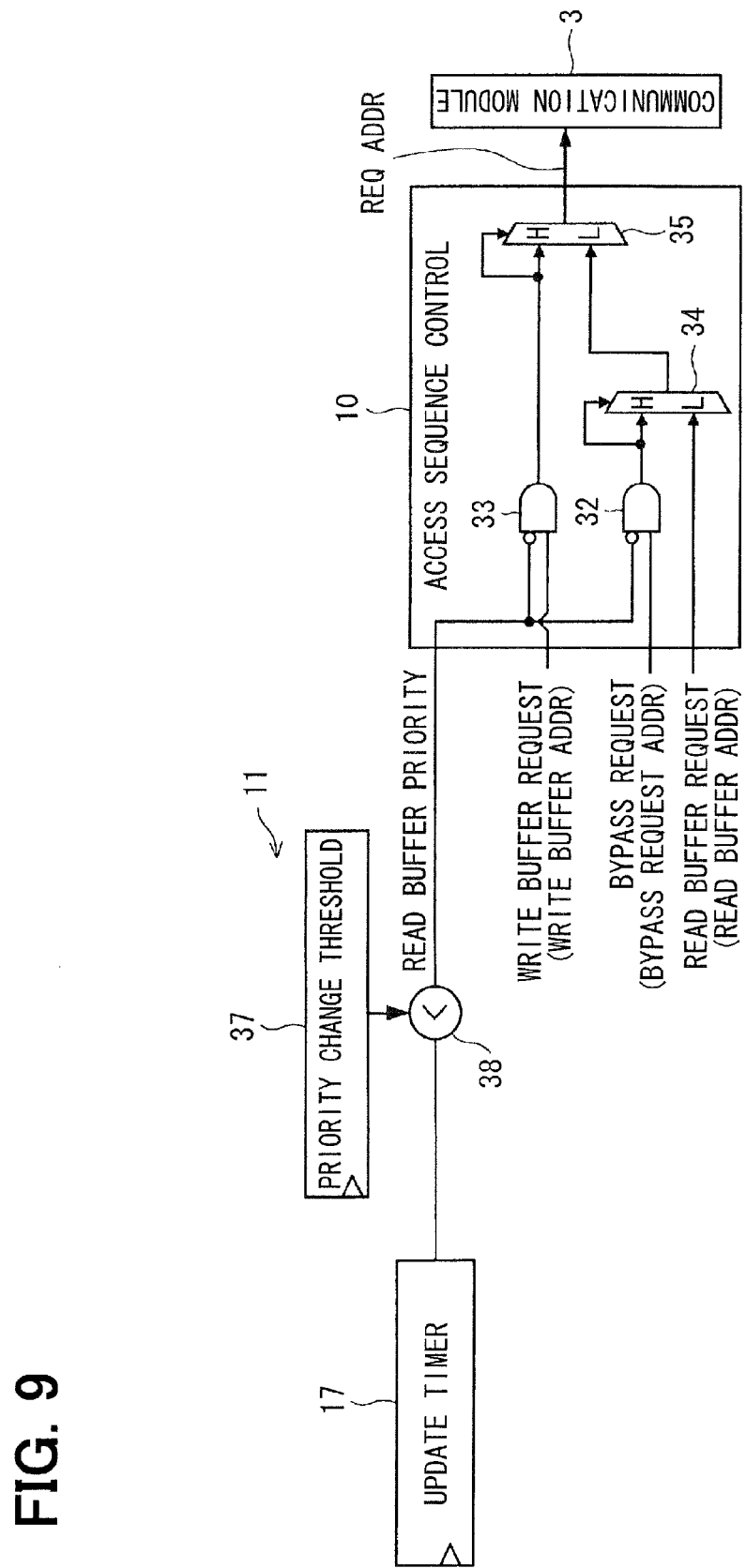
FIG. 9 is a functional block diagram showing an access sequence control section as a main part of a microcomputer according to a third embodiment.
Figure 10:
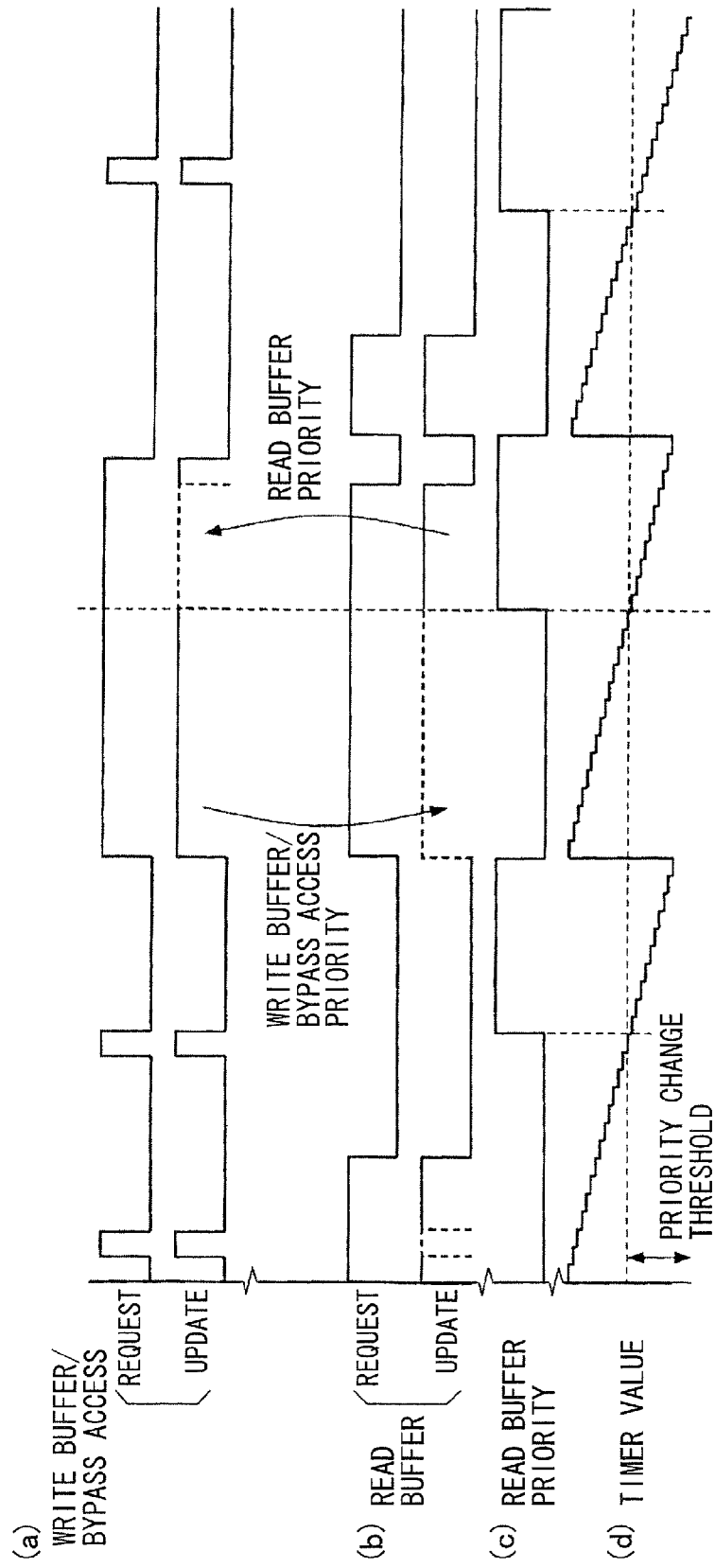
FIG. 10 is a timing chart showing an operation of the third embodiment.

In a third embodiment shown in FIG. 9 and FIG. 10, the access sequence control section 10 partly includes a configuration, which is shown in a logic circuit form. The access sequence control section 10 includes two AND gates 32, 33 and two multiplexers 34, 35. The bypass request signal and the write buffer request signal are applied to one input terminals of the AND gates 32 and 33, respectively. These request signals correspond to the addresses, Bypass Request Addr and the Write Buffer Addr. If it is possible to separate both signals by a specific bit of the address, specific bits may be assigned, respectively. It is also possible to generate the request signals by decoding respective addresses.

A read buffer priority signal is applied to the other inverted input terminals of the AND gates 32, 33. The timer value of the update timer 17 is compared with a threshold value set in a priority change threshold setting register 37 by a comparator 38. If the timer value falls below the threshold value, the read buffer priority signal becomes active (high).

An output terminal of the AND gate 32 is connected to one input terminal of the multiplexer 34 and also to a selection switch-over terminal of the multiplexer 34. The read buffer request signal corresponding to the address Read Buffer Addr is applied to the other input terminal of the multiplexer 34. The output terminal of the AND gate 33 and an output terminal of the multiplexer 34 are connected to input terminals of a multiplexer 35. The output terminal of the AND gate 33 is also connected to a selection switch-over terminal of the multiplexer 35.

Each of the multiplexers 34, 35 selects the input terminal L side and the input terminal H side when the signal level at the selection switch-over terminal is low and high, respectively. The output terminal of the multiplexer 35 applies the address Req Addr to the communication module 3. In FIG. 9, the address and the signal based on the address are shown without distinction. In practice, the address corresponding to the request selected through the multiplexer 35 is applied to the communication module 3 as the address Req Addr.

The operation of the third embodiment will be described next with reference to FIG. 10. At the initial part of the update period of the read buffer 9, the read buffer priority signal is inactive (low) as shown by (c), (d). When the write request to the write buffer 8 is generated while the read buffer 9 is transferring data in this state as shown by (a), the write buffer request signal is selected in the multiplexer 35 and hence writing in the write buffer 8 is performed with priority as shown by (b). When the access request for the bypass path is generated, the bypass request signal is selected through the multiplexers 34, 35 and hence the access to the bypass path is performed with priority. The timer value of the update timer 17 decreases as shown by (d). When the timer value falls below a priority change threshold value set in the register 32, the read buffer priority signal becomes active as shown by (c).

When the latter is performed with priority from the beginning of the update period, for example, due to competition with the access request for the bypass path and the period of such performance, the update of the read buffer 9 remains pending and the timer value of the update timer 17 continues to become lower. When the timer value falls below the threshold value set in the register 32, the read buffer priority signal becomes active. As a result, the buffer request signal (address Read Buffer Addr) is outputted to the communication module 3 through the multiplexers 34, 35. Then the read buffer 9 is updated with priority.

When the remaining time of the update period reaches a limit time, which completes the data transfer within the update period, in case that the communication module 3 transfers the received data to the read buffer 9, the read control section 11 outputs the priority signal, with which the read control section 11 itself accesses the communication module 3 with priority. When the priority signal is applied, the access sequence control section 10 allows the read control section 11 to access the communication module 3 with priority over the request of transferring data to the communication module 3 by the write control section 8a and the bypass access control section 7. Thus, the data transfer to the read buffer 9 can be completed surely within the update period.

(Fourth Embodiment)

Figure 11:
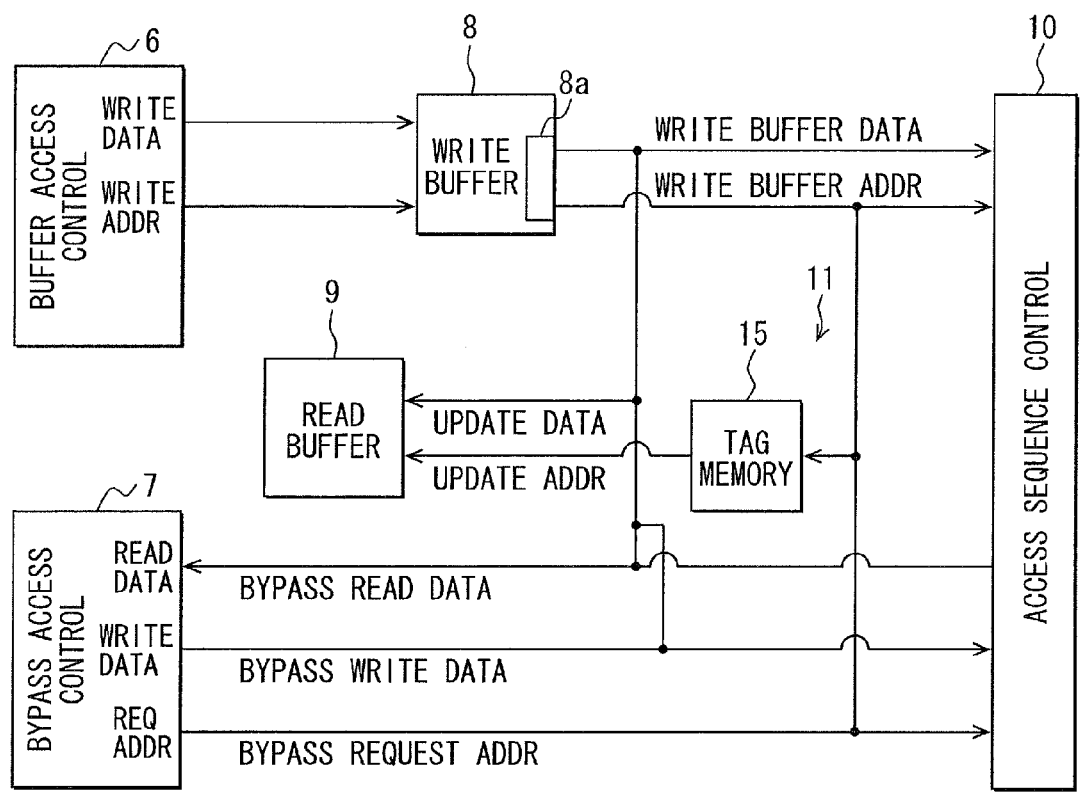
FIG. 11 is a functional block diagram showing partly a microcomputer according to a fourth embodiment.

In a fourth embodiment shown in FIG. 11, the read buffer 9 is controlled by the read control section (data update section) 11. The read control section 11 includes the tag memory 15. The write data Write Buffer Data, the data Bypass Read Data and the data Bypass Write Data are applied to the read buffer 9 as update data Update Data. The write data Write Buffer Data is outputted by the write buffer 8 to the access sequence control section 10. The data Bypass Read Data is outputted to the bypass access control section 7 through the access sequence control section 10. The data Bypass Write Data is outputted from the bypass access control section 7 to the access sequence control section 10.

In the tag memory 15, the base address Update Addr for designating the entry, in which the data Update Data is stored, is also set in the initial setting. Since its base address Update Addr is applied to the read buffer 9, the write address Write Buffer Addr, which the write buffer 8 outputs to the access sequence control section 10, and the address Bypass Request Addr, which the bypass access control section 7 outputs to the access sequence control section 10, are applied. The address bus and the data bus are shown partly as being directly connected. However this does not mean that the buses are physically connected. Rather this means that the address and data are inputted to the read buffer 9 and the tag memory 15 in the OR condition.

In the fourth embodiment, when the data, which the CPU 2 wrote in the write buffer 8, is outputted with the address to the communication module 3 through the access sequence control section 10, the base address Update Addr is applied to the read buffer 9 through the tag memory 15. At the same time, the write data Write Buffer Data is inputted to the read buffer 9 as the data Update Data for updating, and hence the corresponding entry is updated by the data Write Buffer Data.

For example, the data, which the CPU 2 transmits to an external side, are data that are written and stored in an external memory device and the like such as a HDD or a memory card and data that need be stored as the set data. These data are updated only by the CPU 2. By thus writing the write data also in the read buffer 9 and updating the corresponding entry, coherency of data can be maintained surely. Also in a case that the CPU 2 accesses by the bypass path through the bypass access control section 7, the base address Update Addr is applied to the read buffer 9 by the address Bypass Request Addr, and the data Bypass Read Data or the data Bypass Write Data is applied as an update data Update Data. The corresponding entry is thus updated.

As described above, according to the fourth embodiment, the read control section 11 updates the data of the read buffer 9, when the write control section 8a transfers the data written in the write buffer 8 to the communication module 3. The CPU 2 updates the data of the read buffer 9 in case of reading and writing data with the communication module 3 through the bypass path. The CPU 2 can thus immediately reflect in the read buffer 9 the data which is written in the write buffer 8 and transmitted to the other communication node, the data which is directly transmitted to the other communication node or the data which is directly received from the other communication node.

(Fifth Embodiment)

Figure 12:
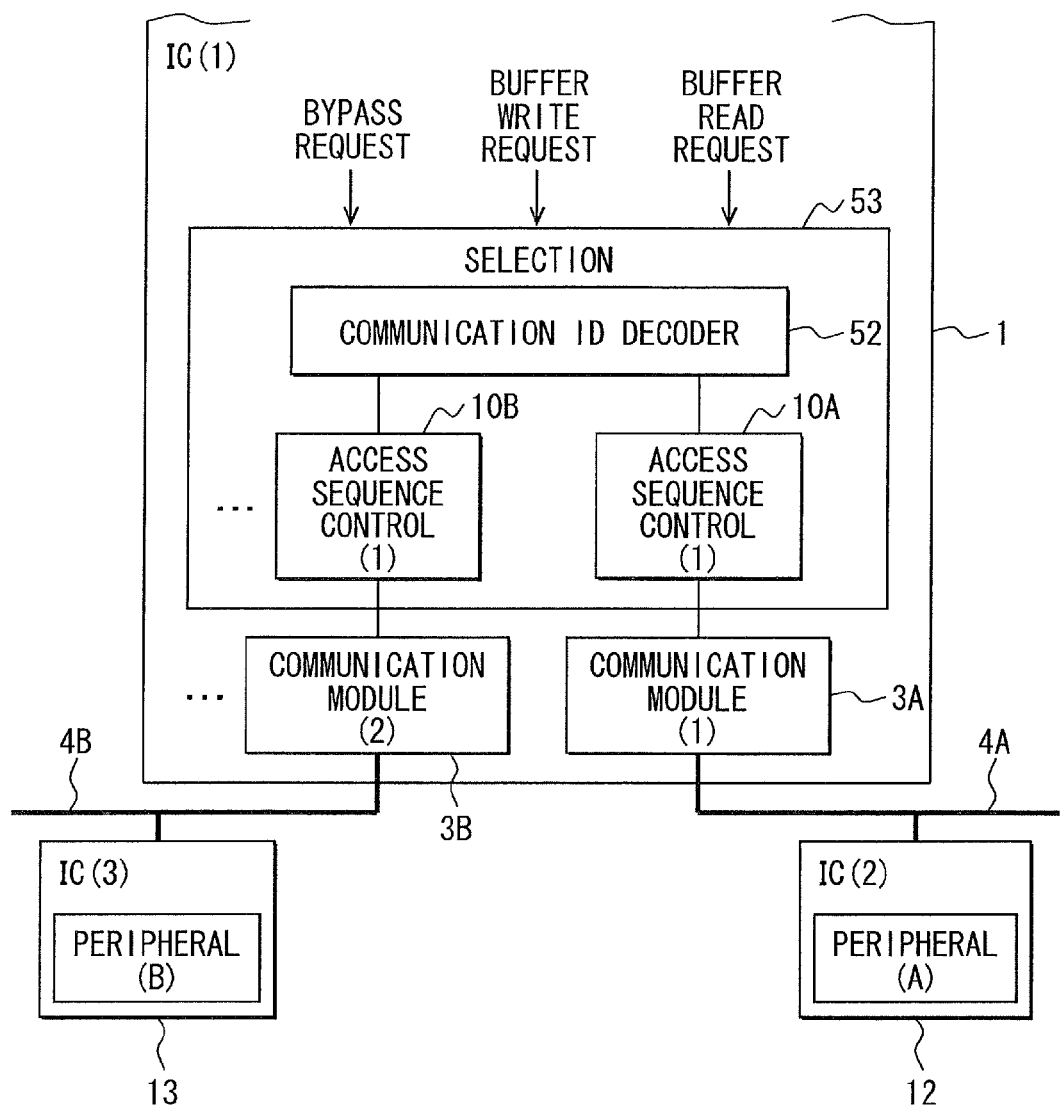
FIG. 12 is a functional block diagram showing partly a microcomputer according to a fifth embodiment.

In a fifth embodiment shown in FIG. 12, the microcomputer 1 is connected with two communication buses 4A, 4B. The peripheral circuit 12 is connected to the communication bus 4A and the peripheral circuit 13 is connected to the communication bus 4. The microcomputer 1 includes two communication modules 3A, 3B and two access sequence control sections 10A, 10B in correspondence to the communication buses 4A, 4B, respectively. The access sequence control sections 10A, 10B form a part of a communication selection section 53 together with a communication ID decoder (communication decoder) 52.

The communication ID decoder 52 switches over the inputted addresses and data buses by selecting either one of a set of the access sequence control section 10A and the communication module 3A and a set of the access sequence control section 10B and the communication module 3B in accordance with the address value outputted from the CPU 2, the read control section 11 and the like to designate the destination of communication. The communication bus 4A, 4B may be divided into three or more and correspondingly the number of sets of the communication module 3A, 3B and the access sequence control section 10A, 10B may be three or more.

According to the fifth embodiment, as described above, a plurality of communication modules 3A, 3B and a plurality of access sequence control sections 10A, 10B are provided. The ID decoder 52 determines which set of the communication modules 3A, 3B and the access sequence control sections 10A, 10B should be used in accordance with the destination of communication designated by the CPU 2 or the read control section 11.

(Sixth Embodiment)

Figure 13:
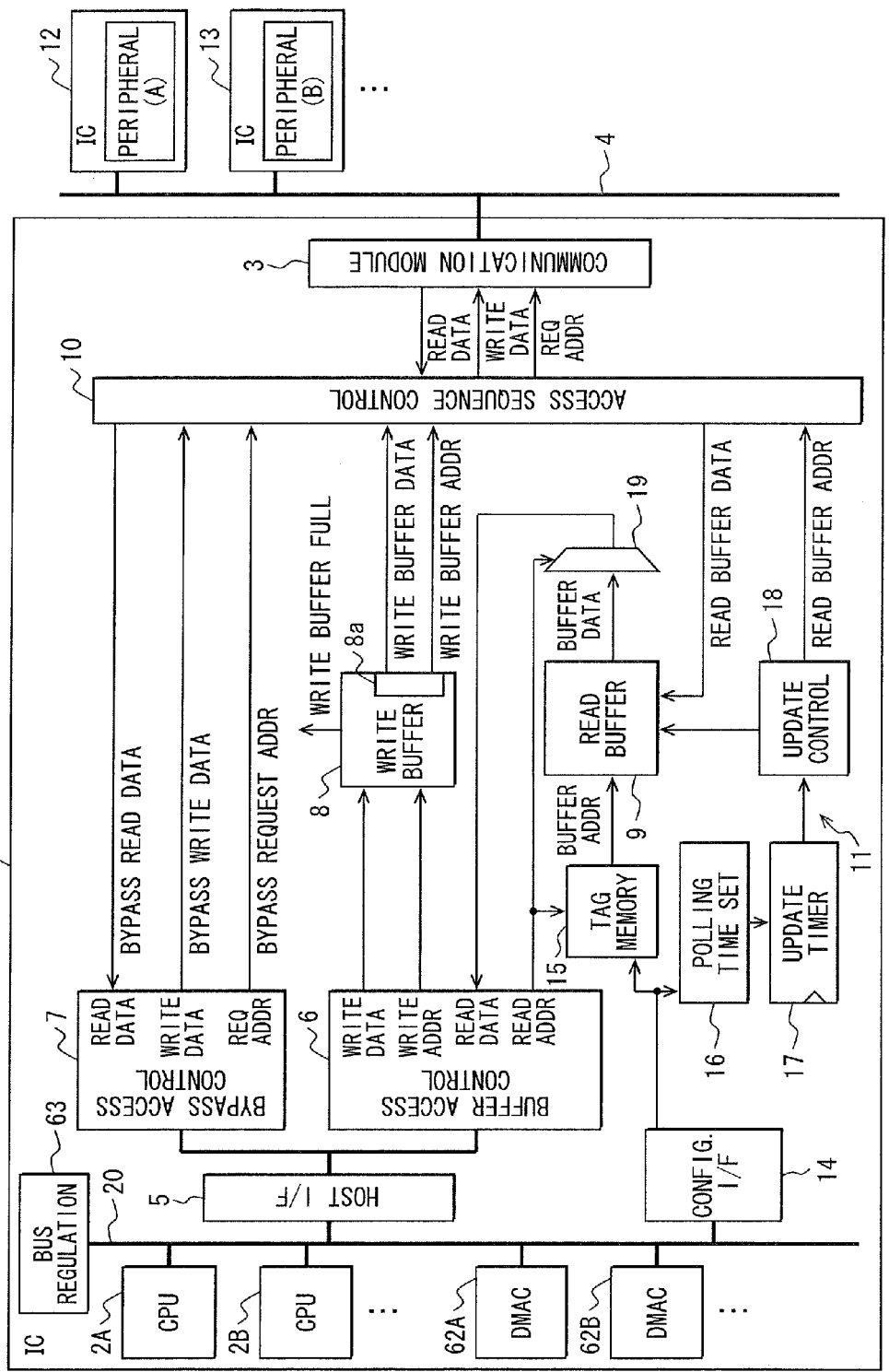
FIG. 13 is a functional block diagram showing partly a microcomputer according to a sixth embodiment.

In a sixth embodiment shown in FIG. 13, the microcomputer 1 includes a plurality of CPUs 2A, 2B and the like and a plurality of DMA controllers (hosts) 62A, 62B and the like are connected to the CPU bus 20. Thus a multi-host configuration is provided. Right of using the CPU bus 20 is regulated by a bus regulation section 63. A circuit, which is given the right of use is allowed to access the write buffer 8 and the read buffer 9 through the host interface 5. According to the sixth embodiment configured above, the microcomputer 1 may be implemented even in case that a plurality of hosts is provided.

The above-described embodiments may be modified as follows.

Writing of data in the write buffer 8, which is generated while data is being transferred to the read buffer 9, and processing, which is performed with priority of accessing the bypass path, may be performed when necessary. If sufficient time is surely provided for the read control section 11 to transfer data to the read buffer 9, the configuration of the third embodiment is not necessary. The host need not be the CPU 2 or the DMA controller 62, but may be a DSP, for example. The data bus size, memory capacity, data transfer speed and the like may be changed in correspondence to each design.

What is claimed is:

1. A microcomputer, which includes a communication module to perform communication with another node connected to a communication network, the microcomputer comprising:

a host, which includes at least a CPU;

a read buffer, which is provided between the communication module and the host and from which the host reads out, at a speed higher than a communication speed of the communication network, data preciously read out from the communication module;

a write buffer, which is provided between the communication module and the host and into which the host writes data at a speed higher than the communication speed of the communication network;

a read control section stored in a memory, which periodically outputs a communication request to the communication module so that the communication module transfers data received from the other node to the read buffer, the communication request including a data read destination designated by the host;

a write control section stored in the memory, which transfers the data written in the write buffer to the communication module as a transmission data;

a bypass access control section stored in the memory, which enables the host to perform reading and writing of data directly with the communication module rather than through the read buffer and the write buffer upon request from the host; and an access sequence control stored in the memory, which variably controls a sequence of accesses of the read control section, the write control section, and the bypass access control section to the communication module, and which selects a data transfer path between the host and the communication module either through, or bypassing, the read buffer and the write buffer, wherein the access sequence control section interrupts transfer of data and causes the host to perform writing of data into the write buffer with priority, when the host generates a request of writing in to the write buffer while the read control section is transferring data to the read buffer, the access sequence control section interrupts transfer of data and causes the host to perform an access to the communication module with priority, when the host generates a request of access to the communication module, which is performed through the bypass access control section, while the read control section is transferring data to the read buffer, and access to the write buffer, by the host, for transferring data to the access sequence control section is performed with priority over direct access to the access sequence control section, by the host, through the bypass access control section.

2. The microcomputer according to claim 1, wherein:

the read control section outputs a priority signal for accessing to the communication module with priority, when a remaining time of the period reaches a limit time provided to complete the transfer of data within a period in case of transferring the data, which the communication module received, to the read buffer; and the access sequence control section allows, in response to the priority signal, the read control section to access the communication module with priority over the request of transferring data to the communication module by the write control section and the bypass access control section.

3. The microcomputer according to claim 1, further comprising:

a data update section stored in the memory, which updates the data of the read buffer in case of transferring the data written in the write buffer to the communication module.

4. The microcomputer according to claim 1, further comprising:

a data update section stored in the memory, which updates the data of the read buffer in case of reading and writing data with the communication module through a bypass path.

5. The microcomputer according to claim 1, wherein:

the read control section generates the communication request at a plurality of independent periods; and the access sequence control section accepts an other communication request after completing the transfer of data being performed, when the other communication request of the other period is generated while the read control section is performing the transfer of data to the read buffer in response to any one of the communication requests.

6. The microcomputer according to claim 1, wherein:

the communication module and the access sequence control section are provided for each of other communication nodes connected to the communication network; and a communication decoder is provided to determine which one of sets of communication modules and access sequence control sections is used in accordance with communication destination designated by the host or the read control section.

7. The microcomputer according to claim 1, wherein:

the read control section outputs a priority signal for accessing to the communication module with priority, when a remaining time of the period reaches a limit time provided to complete the transfer of data within a period in case of transferring the data, which the communication module received, to the read buffer; and the access sequence control section allows, in response to the priority signal, the read control section to access the communication module with priority over the request of transferring data to the communication module by the write control section and the bypass access control section.

8. A microcomputer, which includes a communication module to perform communication with another node connected to a communication network, the microcomputer comprising:

a host, which includes at least a CPU;

a read buffer, which is provided between the communication module and the host and from which the host reads out, at a speed higher than a communication speed of the communication network, data previously read out from the communication module;

a write buffer, which is provided between the communication module and the host and into which the host writes data at a speed higher than the communication speed of the communication network;

a read control circuit stored in a memory, which periodically outputs a communication request to the communication module to read data so that the communication module transfers data received from the other node to the read buffer, the communication request including a data read destination designated by the host;

a write control circuit stored in the memory, which transfers the data written in the write buffer to the communication module as a transmission data;

a bypass access control circuit stored in the memory, which enables the host to perform reading and writing of data directly with the communication module rather than through the read buffer and the write buffer upon request from the host; and an access sequence control circuit stored in the memory, which variably controls a sequence of accesses of the read control circuit, the write control circuit and the bypass access control circuit to the communication module, and which selects a data transfer path between the host and the communication module either through, or bypassing, the read buffer and the write buffer, wherein the access sequence control circuit interrupts transfer of data and causes the host to perform writing of data into the write buffer with priority, when the host generates a request of writing into the write buffer while the read control circuit is transferring data to the read buffer, the access sequence control circuit interrupts transfer of data and causes the host to perform an access to the communication module with priority, when the host generates a request of access to the communication module, which is performed through the bypass access control circuit, while the read control circuit is transferring data to the read buffer, and access to the write buffer, by the host, for transferring data to the access sequence control circuit is performed with priority over a direct access to the access sequence control circuit, by the host, through the bypass access control circuit.

* * * * *